US009465459B2

(12) United States Patent
Singh et al.

(10) Patent No.: US 9,465,459 B2
(45) Date of Patent: Oct. 11, 2016

(54) ELECTRONIC DEVICE INCLUDING TOUCH-SENSITIVE DISPLAY AND METHOD OF DETECTING NOISE

(71) Applicant: RESEARCH IN MOTION LIMITED, Waterloo (CA)

(72) Inventors: Amit Pal Singh, Waterloo (CA); Premal Vinodchandra Parekh, Waterloo (CA)

(73) Assignee: BlackBerry Limited, Waterloo (CA)

( * ) Notice: Subject to any disclaimer, the term of this patent is extended or adjusted under 35 U.S.C. 154(b) by 457 days.

(21) Appl. No.: 13/770,788

(22) Filed: Feb. 19, 2013

(65) Prior Publication Data
US 2014/0232663 A1 Aug. 21, 2014

(51) Int. Cl.
*G06F 3/041* (2006.01)

(52) U.S. Cl.
CPC ............. *G06F 3/041* (2013.01); *G06F 3/0418* (2013.01)

(58) Field of Classification Search
CPC ...... G06F 3/041; G06F 3/042; G06F 3/0414; G06F 3/0416; G06F 3/0418; G06F 11/002; G06F 2203/04105
See application file for complete search history.

(56) References Cited

U.S. PATENT DOCUMENTS

| 2002/0135568 A1 | 9/2002 | Chen | |
|---|---|---|---|
| 2006/0138574 A1 | 6/2006 | Saito et al. | |
| 2007/0001681 A1* | 1/2007 | Sato | 324/457 |
| 2011/0285661 A1 | 11/2011 | Hotelling | |
| 2012/0127124 A1* | 5/2012 | Zanone et al. | 345/174 |
| 2012/0200524 A1* | 8/2012 | Vallis et al. | 345/174 |
| 2013/0076688 A1* | 3/2013 | Tokutake | 345/174 |
| 2013/0127773 A1* | 5/2013 | Kwon et al. | 345/174 |

FOREIGN PATENT DOCUMENTS

| GB | WO2009027629 | * | 5/2009 |
|---|---|---|---|
| WO | 2009/027629 A1 | | 3/2009 |

OTHER PUBLICATIONS

Extended European Search Report dated Jun. 20, 2013, issued in respect of corresponding European Patent Application No. 13155856.1.

* cited by examiner

*Primary Examiner* — Aneeta Yodichkas
(74) *Attorney, Agent, or Firm* — Borden Ladner Gervais LLP; Geoffrey deKleine

(57) ABSTRACT

An electronic device includes a touch-sensitive display that includes drive electrodes and sense electrodes configured to detect touches on the touch-sensitive display, a noise-detection electrode spaced from the drive electrodes and the sense electrodes, at least one controller operably coupled to the drive electrodes, the sense electrodes, and the noise-detection electrode and configured to detect touches on the touch-sensitive display utilizing the drive electrodes and the sense electrodes, and detect noise utilizing the noise-detection electrode during touch detection.

16 Claims, 3 Drawing Sheets

ELECTRONIC DEVICE INCLUDING TOUCH-SENSITIVE DISPLAY AND METHOD OF DETECTING NOISE

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
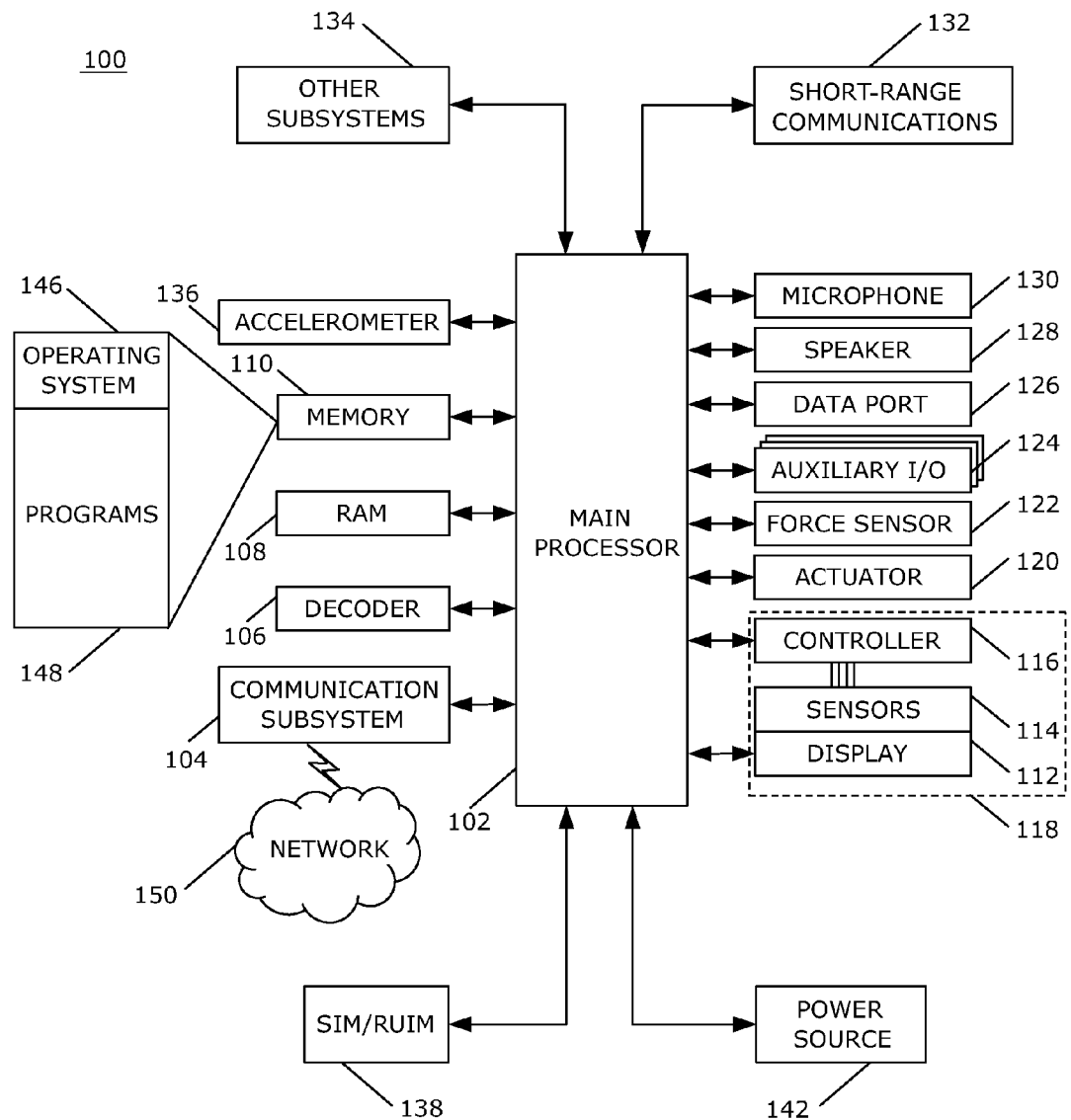
FIG. 1 is a block diagram of a portable electronic device in accordance with the disclosure.

The following describes an electronic device and a method of detecting noise in an electronic device. The electronic device includes drive electrodes and sense electrodes configured to detect touches on a touch-sensitive display. Another electrode, a noise-detection electrode, is spaced from the drive electrodes and the sense electrodes and does not cross over or under the drive electrodes or the sense electrodes. The noise-detection electrode is utilized to detect noise during touch detection. Noise may be detected while drive electrodes are driven.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smartphones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes one or more capacitive touch sensors. Thus, for a capacitive touch-sensitive display, the sensors 114 comprise capacitive touch sensors. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
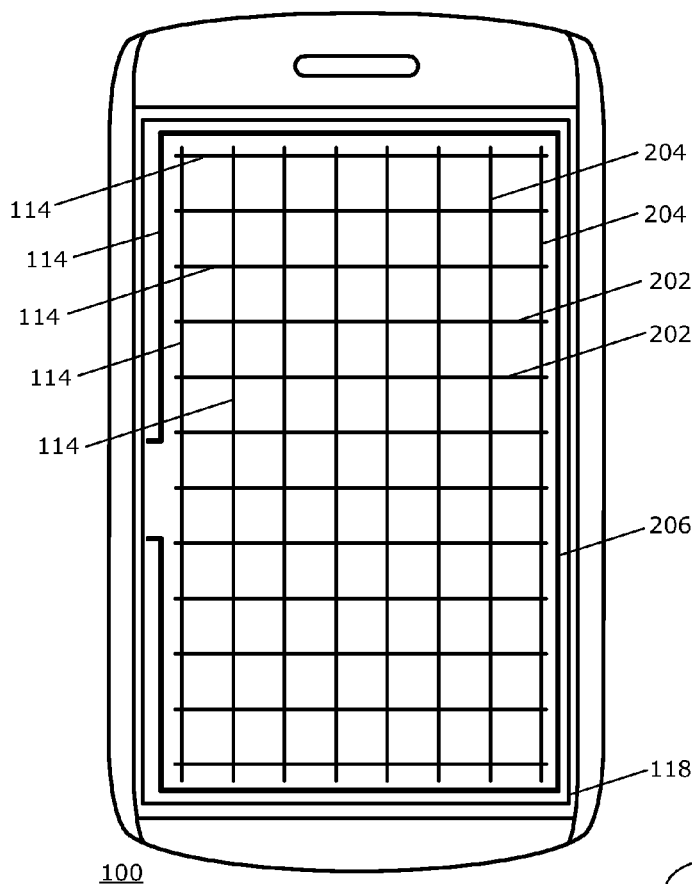
FIG. 2 is a front view of an electronic device in accordance with the disclosure.

A front view of an electronic device 100 with a plurality of sensors 114 is shown in the example of FIG. 2. The sensors 114 are shown for the purpose of illustration, but are not visible to the eye when looking at the front of the electronic device 100.

The sensors 114 include touch-sensing electrodes comprising drive electrodes 202 and sense electrodes 204 configured to detect touches on the touch-sensitive display 118. The drive electrodes 202 extend generally horizontally and the sense electrodes 204 extend generally vertically in the example of FIG. 2. The drive electrodes 202 and the sense electrodes 204 may extend in other directions. For example, the drive electrodes 202 may extend generally vertically and the sense electrodes 204 may extend generally horizontally. The terms "vertically" and "horizontally" are utilized herein to provide reference to an orientation of the electronic device 100 in the drawings and are not otherwise limiting.

The drive electrodes 202 and sense electrodes 204 may be disposed on different planes of the touch-sensitive display 118. Alternatively, jumpers may be included such that the sense electrodes 204 cross over and are electrically isolated from the drive electrodes 202. The sensors 114 also include a noise-detection electrode 206 that is spaced from the drive electrodes 202 and the sense electrodes 204 such that the noise-detection electrode 206 does not cross over or under the drive electrodes 202 or the sense electrodes 204.

The noise-detection electrode 206 may, for example, extend around the drive electrodes 202 and the sense electrodes 204. In the example of FIG. 2, the noise-detection electrode 206 is a ring that extends around the outermost perimeter of drive electrodes 202 and the sense electrodes 204. The noise-detection electrode 206 may also be utilized as an electrostatic discharge ring. An electrostatic discharge ring may be utilized as the noise-detection electrode.

The noise-detection electrode 206 may be disposed on the same layer of the touch-sensitive display 118 as the drive electrodes 202 or the same layer of the touch-sensitive display 118 as the sense electrodes 204. The noise-detection electrode 206 may be made of the same material as the drive electrodes 202 or the sense electrodes 204. Alternatively, the noise-detection electrode 206 may be disposed on another layer of the touch-sensitive display 118. The noise-detection electrode 206 may be disposed in the display area of the touch-sensitive display 118 and may be transparent. Alternatively, the noise-detection electrode 206 may be disposed in the non-display area of the touch-sensitive display 118 and may be, for example, a non-transparent material. The noise-detection electrode 206 may alternatively be disposed separate from the touch-sensitive display 118, such as on a printed circuit board of the electronic device 100, on a housing of the electronic device, and so forth.

in this example, the drive electrodes 202, the sense electrodes 204, and the noise-detection electrode 206 are operably coupled to the controller 116. The controller 116 is configured to drive the drive electrodes 202 and receive signals from the sense electrodes 204 during touch detection. The controller 116 is also configured to detect noise by receiving signals from the noise-detection electrode 206 during touch detection. The noise includes electrical noise from sources internal to the electronic device 100, such as from the processor 102, display 112, power source 142, speaker 128, microphone, 130, and so forth, and sources external to the electronic device 100, such as other electrical devices or energy sources. For example, noise caused by charging the electronic device 100 may be detected. The controller 116 is configured to drive one or more drive electrodes 202 while detecting noise utilizing the noise-detection electrode 206. At least one drive electrode 202 may be driven during the same period of time in which the noise-detection electrode 206 is utilized to detect noise. The term "while", as utilized herein, includes: driving a drive electrode and detecting noise during the same period of time; driving a drive electrode 202 synchronously or asynchronously with detecting noise; driving a drive electrode 202 overlapping at least partially in time with detecting noise; driving a drive electrode such that the drive time overlaps at least partially with the noise detection time; driving more than one drive electrode 202 during detecting noise. Noise detection and driving the drive electrode may be offset in time. Noise detection may begin when driving a drive electrode begins or may begin at different times. Noise detection may end at the same time that driving the drive electrode ends or may end at a different time. Noise detection may be carried out during driving a plurality of the drive the electrodes. Noise detection may be continuously performed during touch detection.

The noise-detection electrode 206 is advantageously not a drive electrode 202 or a sense electrode 204 that is utilized for touch detection. The noise-detection electrode 206 does not cross over or under any of the drive electrodes 202 or the sense electrodes 204 to facilitate better noise detection during touch detection. Noise, such as noise from the display 112, may be detected during frames of a scan to detect touches. A separate frame or frames of the scan are not required for noise detection. The scanning time for touch detection and noise detection may be reduced compared to a device that utilizes a sense electrode for noise detection to detect noise when none of the drive electrodes are driven.

The controller 116 may be configured to alter at least one touch detection parameter to reduce the effect of noise, or increase the signal-to-noise ratio, during touch sensing. The touch-detection parameters that are changed may include, for example, the frequency with which the drive electrodes 202 are driven, the number of pulses of signal utilized to drive the drive electrodes 202, the scanning rate, filtering, and so forth. For example, each drive electrode 202 may be driven with 4 pulses when a noisy condition is not detected and may be driven with 8 pulses when a noisy condition is detected. The time to perform a scan of the touch-sensitive display 118 may be greater when a greater number of pulses is utilized to drive the drive electrodes 202, 204. When a noisy condition is detected, a greater number of pulses may be utilized over a longer period of time. When a noisy condition is not detected, fewer pulses may be utilized over a shorter period of time. Optionally, noise filtering may be increased. For example, the order of the filter may be increased to increase the filtering.

The controller 116 may be configured to control touch data filtering, to increase or decrease touch data filtering based on the noise detected during touch detection, and so forth. Digital filtering such as infinite impulse response (IIR) filtering may be carried out to reduce the effect of noise on touch detection. The order of the filter may be increased or decreased based on the noise detected. The raw data that is utilized to generate the x and y coordinate values may be filtered. In addition to or instead of filtering the raw data, the x and y coordinate values of the touch may filtered to increase accuracy of the touch location that is identified. The controller 116 may also control the number of pulses of the signal that is utilized to drive the drive electrodes 202 during touch detection. The number of pulses of the signal may be increased or decreased during touch detection. For example, in response to detecting noise, the number of pulses of the signal may be increased during touch detection to reduce the effect of noise on touch detection. The scanning rate of the touch-sensitive display may be altered based on noise detected during touch detection. The controller 116 may also be configured to alter a time or frequency at which the drive electrodes are driven. The controller 116 may change the frequency or frequency range of scanning of the touch-sensitive display 118 to a frequency or frequency range that is less noisy. Other methods to reduce the noise or the effect of noise on touch data may also be utilized when noise is detected during touch detection.

Figure 3:
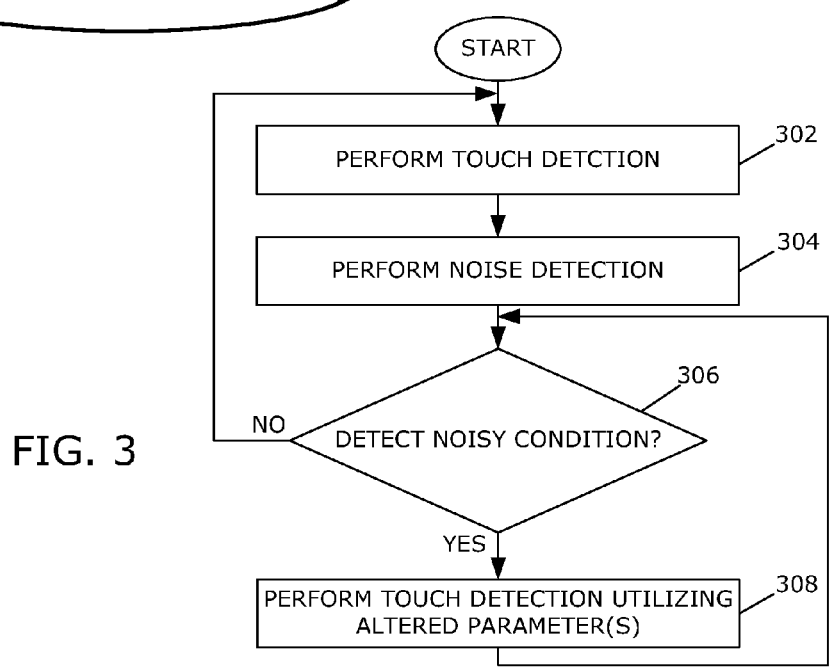
FIG. 3 is a flowchart illustrating a method of detecting touches in accordance with the disclosure.

A flowchart illustrating a method of detecting noise on the touch-sensitive display 118 is illustrated in FIG. 3. The method may be carried out by software executed, for example, by the controller 116 and/or the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the electronic device to perform the method may be stored in a computer-readable storage medium, device, or apparatus, which may be a non-transitory or tangible storage medium.

Touch detection is performed 302 to detect touches on the touch-sensitive display 118. The drive electrodes 202 are driven while receiving signals from the sense electrodes 204 in frames during touch detection scanning. The drive electrodes 202 may be driven with a predetermined number of pulses in a frame. For example, each drive electrode 202 may be driven with 4 pulses when noise is not detected or when the detected noise does not meet a threshold value. Noise detection is performed 304 during touch detection by receiving signals from the noise-detection electrode 206 and comparing the signals from the noise-detection electrode 206 to a baseline value. The baseline value may be a set value or may be a value determined based on signals previously received from the noise-detection electrode 206. For example, the amplitude of the signal from the noise-detection electrode 206 may be compared to a baseline amplitude value. When the difference between the signal value and the baseline value meets a threshold, a noisy condition is detected. Alternatively, a noisy condition may be detected when the signal received from the noise-detection electrode 206 meets a threshold value. Noise detection may be performed while one or more of the drive electrodes 202 are driven.

In response to detecting 306 a noisy condition, at least one touch-detection parameter is changed 308 to reduce the effect of noise on touch detection.

Figure 4:
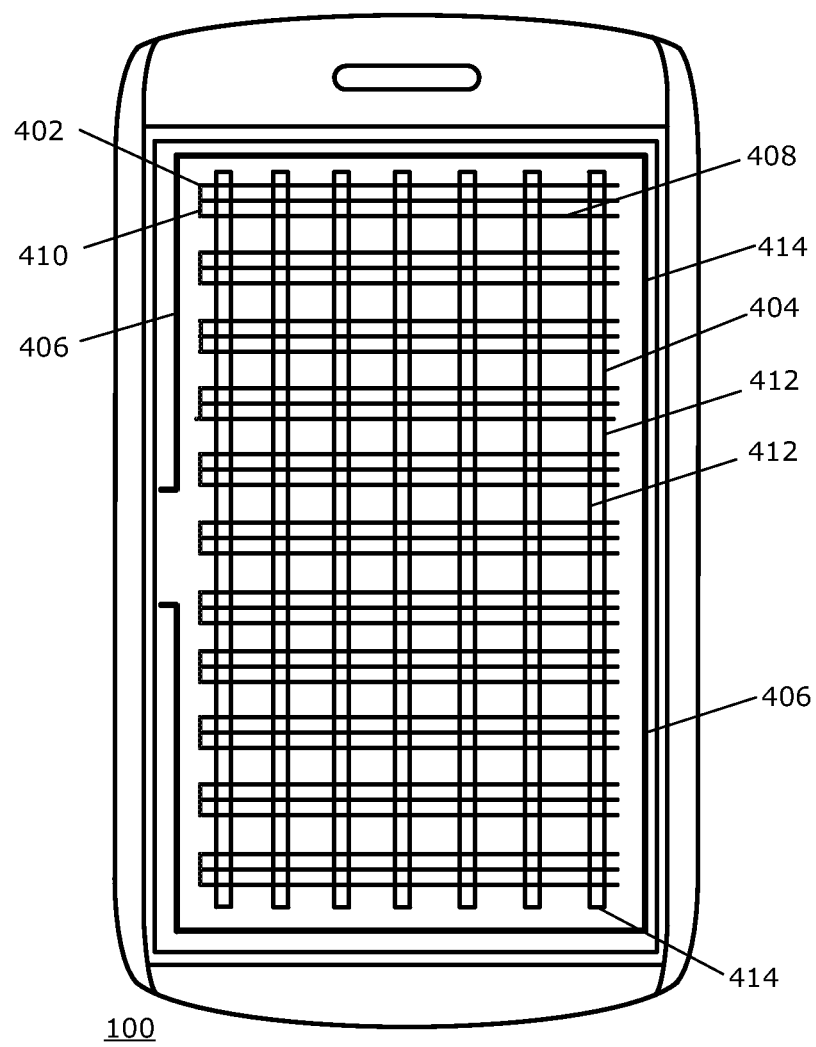
FIG. 4 is a front view of another electronic device in accordance with the disclosure.

A front view of another example of an electronic device 100 is shown in FIG. 4. Drive electrodes 402, sense electrodes 404, and a noise-detection electrode 406 are shown for the purpose of illustration, but are not visible to the eye when looking at the front of the electronic device 100.

In the example of FIG. 4, the drive electrodes 402 include three generally horizontal detection lines 408 that are joined together at one end 410. The sense electrodes 406 include two generally vertical detection lines 412 that are joined at the ends 414. Other shapes of drive and sense electrodes may successfully be implemented. Alternatively, the drive electrodes may extend generally vertically and the sense electrodes may extend generally horizontally.

A method includes performing touch detection on a touch-sensitive display of an electronic device by driving drive electrodes at a first frequency while sensing utilizing sense electrodes to obtain touch data, and filtering the touch data to identify touches. The method includes detecting noise based on signals from a noise-detection electrode that is spaced from the drive electrodes and the sense electrodes, wherein noise is detected while driving at least one of the drive electrodes, and in response to detecting noise that meets a threshold, altering at least one touch detection parameter to reduce the effect of noise.

Noise may be detected when no touch detection is performed. Noise may also be detected while drive electrodes are driven to detect touches. A separate frame or frames of the scan are not required for noise detection. Additionally, noise may be detected during any number of frames of the scan. For example, noise may be detected during all of the frames of the scan. In response to detecting a noisy condition, touch detection may be altered to reduce the effect of noise on touch detection.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the dams are to be embraced within their scope.

What is claimed is:

1. An electronic device comprising:
 a touch-sensitive display comprising:
  drive electrodes generally extending in a first direction and sense electrodes generally extending in a second direction and spaced from the drive electrodes such that the sense electrodes cross the drive electrodes to detect touches on the touch-sensitive display;
  a noise-detection electrode spaced from the drive electrodes and the sense electrodes, the noise-detection electrode extending around a perimeter of the drive electrodes and the sense electrodes and including a side extending in the first direction and a side extending in the second direction such that the noise-detection electrode includes sides that extend generally parallel with sides of the touch-sensitive display;
 at least one controller operably coupled to the drive electrodes, the sense electrodes, and the noise-detection electrode and configured to:
  perform first touch detection on the touch-sensitive display by driving each of the drive electrodes with a first number of pulses and sensing utilizing the sense electrodes; and
  detect first noise utilizing the noise-detection electrode during the first touch detection;
  in response to detecting a noisy condition by determining that the first noise meets a threshold noise value:
   perform second touch detection on the touch-sensitive display by driving each of the drive electrodes with a second number pulses that is greater than the first number of pulses and sensing utilizing the sense electrodes;
   detect second noise utilizing the noise-detection electrode during second touch detection; and
   in response to determining that the second noise does not meet the threshold noise value, repeat first touch detection by driving each of the drive electrodes with the first number of pulses.

2. The electronic device according to claim 1, wherein the at least one controller is configured to alter a further touch-detection parameter to reduce an effect of noise.

3. The electronic device according to claim 1, wherein the at least one controller is configured to filter touch data and to increase touch data filtering in response to detecting the noisy condition.

4. The electronic device according to claim 1, wherein the at least one controller is configured to alter a time period in which the drive electrodes are driven in response to detecting the noisy condition.

5. The electronic device according to claim 1, wherein the at least one controller is configured to reduce a scanning rate of the touch-sensitive display in response to detecting the noisy condition.

6. The electronic device according to claim 1, wherein the noise-detection electrode does not cross over or under any of the drive electrodes.

7. The electronic device according to claim 1, wherein the noise-detection electrode comprises a ring extending around the drive electrodes and the sense electrodes.

8. The electronic device according to claim 1, wherein the noise-detection electrode comprises an electrostatic discharge ring.

9. A method comprising:
performing first touch detection on a touch-sensitive display of an electronic device by driving each drive electrode of a plurality of drive electrodes with a first number of pulses and sensing utilizing sense electrodes, wherein the drive electrodes generally extend in a first direction and the sense electrodes generally extend in a second direction and are spaced from the drive electrodes such that the sense electrodes cross the drive electrodes to detect touches;
detecting first noise by receiving signals from a noise-detection electrode spaced from the drive electrodes and the sense electrodes, while performing first touch detection on the touch-sensitive display, the noise-detection electrode extending around a perimeter of the drive electrodes and the sense electrodes and including a side extending in the first direction and a side extending in the second direction such that the noise-detection electrode includes sides that extend generally parallel with sides of the touch-sensitive display, wherein the noise-detection electrode is different from the sense electrodes;
in response to detecting a noisy condition by determining that the first noise meets a threshold noise value:
performing second touch detection on the touch-sensitive display by driving each of the drive electrodes with a second number pulses that is greater than the first number of pulses and sensing utilizing the sense electrodes;
detecting second noise utilizing the noise-detection electrode during second touch detection; and
in response to determining that the second noise does not meet the threshold noise value, repeating first touch detection by driving each of the drive electrodes with the first number of pulses.

10. The method according to claim 9, comprising altering a further touch-detection parameter in response to detecting the noisy condition while performing first touch detection on the touch-sensitive display.

11. The method according to claim 10, wherein the noisy condition is detected when the detected noise meets a threshold.

12. The method according to claim 9, comprising filtering touch data during first touch detection and increasing filtering in response to detecting the noisy condition.

13. The method according to claim 9, comprising altering a frequency with which the drive electrodes are driven in response to detecting the noisy condition.

14. The method according to claim 9, comprising altering a scanning rate of the touch-sensitive display in response to detecting the noisy condition.

15. The method according to claim 9, wherein at least one drive electrode is driven to detect touches while detecting noise during first touch detection.

16. A non-transitory computer-readable storage device having computer-readable code stored thereon, the computer-readable code executable by at least one processor of an electronic device to:
perform first touch detection on a touch-sensitive display of the electronic device by driving drive electrodes with a first number of pulses and sensing utilizing sense electrodes, wherein the drive electrodes generally extend in a first direction and the sense electrodes generally extend in a second direction and are spaced from the drive electrodes such that the sense electrodes cross the drive electrodes to detect touches;
detect first noise by receiving signals from a noise-detection electrode spaced from the drive electrodes and the sense electrodes, while performing first touch detection on the touch-sensitive display, the noise-detection electrode extending around a perimeter of the drive electrodes and the sense electrodes and including a side extending in the first direction and a side extending in the second direction such that the noise-detection electrode includes sides that extend generally parallel with sides of the touch-sensitive display;
in response to detecting a noisy condition by determining that the first noise meets a threshold noise value:
perform second touch detection on the touch-sensitive display by driving each of the drive electrodes with a second number of pulses that is greater than the first number of pulses and sensing utilizing the sense electrodes;
detect second noise utilizing the noise-detection electrode during second touch detection; and
in response to determining that the second noise does not meet the threshold noise value, repeat first touch detection by driving each of the drive electrodes with the first number of pulses.

* * * * *